Figure 1:
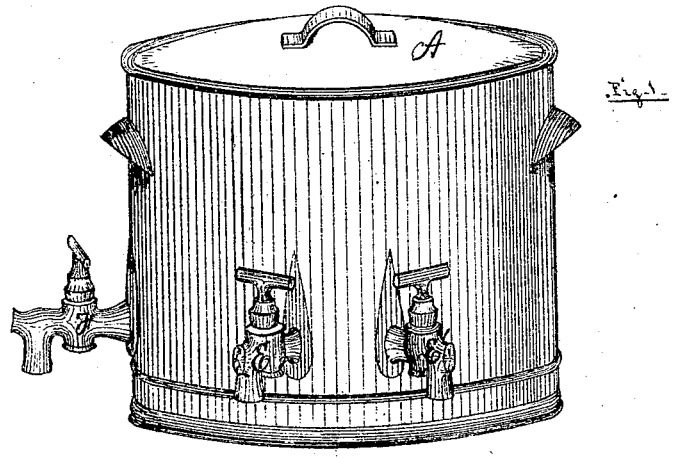

C. GEENEN.

Improvement in Beer and Water Coolers.

No. 123,390.

Patented Feb. 6, 1872.

Witnesses —

Inventor.

123,390

UNITED STATES PATENT OFFICE.

CHARLES GEENEN, OF NEW ORLEANS, LOUISIANA.

IMPROVEMENT IN BEER AND WATER COOLERS.

Specification forming part of Letters Patent No. 123,390, dated February 6, 1872.

I, CHARLES GEENEN, of the city of New Orleans and State of Louisiana, have invented a new, useful, and Improved Water and Beer Cooler; and I hereby declare the following to be a full, clear, and exact description of the same, reference being had to the drawing hereto annexed forming a part of said description.

My device relates to that class of coolers or refrigerators which have an interior ice-receptacle, an outer inclosed chamber, in which is placed some non-conducting material or substance, and an intermediate chamber or chambers, in which, and through which, the beer is made to pass directly from the barrel or vessel in which the beer is contained. The object which I have in view in my device is to furnish a cooler or refrigerator which shall be portable, cheap, and conveniently handled or moved from one place or position to another in a store or other room, wherever it may be required to use it, and, at the same time, easily attached, by means of pipes, flexible or otherwise, to the barrel or vessel containing the beer which it is desired to cool; but my improvement will be more clearly understood by reference to the annexed drawing, whereon all that I claim as appertaining thereto is very clearly shown, and on which—

Figure 2:
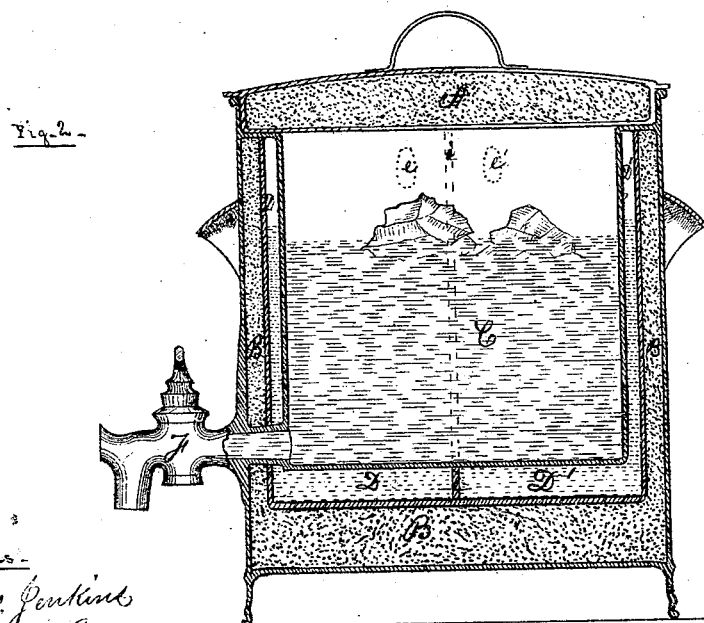

Figure 1 represents a perspective view of the cooler as when complete and ready for use. Fig. 2 is a vertical section of the same.

A is the cover, which can be removed or put on at pleasure, and is made double and filled with pulverized charcoal, rosin, or any other suitable and equivalent material. B is an inclosed chamber, surrounding the whole device, and likewise filled with some non-conducting material like the cover A. C is the interior ice-receptacle, and D D' are the intermediate chambers, through which the beer to be cooled is made to pass directly from the barrel or other vessel in which it may be contained when brought to the place of consumption. The dotted lines e e' indicate the position in the rear of the cooler in which are placed the couplings to which the tubes that convey the beer from the barrel are connected to the cooler. E E' are cocks, by means of which the beer is drawn from the intermediate or cooling-chamber or chambers, as the case may be; for I usually divide the intermediate chamber into two parts, as shown at i, so as to draw from two barrels or vessels at the same time. This arrangement is especially desirable in the event of the beer in one barrel becoming a little stale or flat, and when it is desired to put on tap a new or fresh barrel, so as to be enabled conveniently to mix the beer from both barrels together. F shows the cock, by means of which cold or ice-water may be drawn directly from the ice-receptacle.

I usually construct my cooler of galvanized iron; but it may be made of wood or any other suitable material.

Having described my improvement, what I desire to secure by Letters Patent is the following:

Claim.

A water or beer-cooler, consisting of chambers and removable top A, the latter being so formed as to leave a receptacle for charcoal or other non-conducting material, and chambers D D', the whole being so combined, constructed, and arranged as to permit of its being used in connection with two independent vessels at one and the same time, substantially as described.

CHS. GEENEN.

Witnesses:
H. N. JENKINS,
E. H. LEVY.